United States Patent
Richter

(10) Patent No.: US 6,651,461 B2
(45) Date of Patent: Nov. 25, 2003

(54) CONVEYOR BELT

(75) Inventor: Paul J. Richter, Chelmsford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 135 days.

(21) Appl. No.: 09/871,459

(22) Filed: May 31, 2001

(65) Prior Publication Data
US 2002/0178754 A1 Dec. 5, 2002

(51) Int. Cl.⁷ .............................................. C03B 25/00
(52) U.S. Cl. ........................... 65/111; 65/118; 65/120; 65/138; 65/155; 65/347; 65/375; 198/699.1; 198/848; 198/863.14; 198/836.1; 198/820; 198/801; 198/819; 198/836.2; 198/836.3
(58) Field of Search ......................... 65/111, 118, 138, 65/120, 155, 347, 375; 414/157, 331.13, 941; 198/699.1, 803.14, 819, 820, 801, 836.1, 848, 836.2, 836.3

(56) References Cited

U.S. PATENT DOCUMENTS

| 2,711,983 A | | 6/1955 | Hoyt |
| 3,526,207 A | * | 9/1970 | Nadelson |
| 3,729,819 A | | 5/1973 | Horie |
| 3,798,370 A | | 3/1974 | Hurst |
| 4,198,539 A | | 4/1980 | Pepper, Jr. |
| 4,220,815 A | | 9/1980 | Gibson et al. |
| 4,293,734 A | | 10/1981 | Pepper, Jr. |
| 4,369,063 A | | 1/1983 | McGowan, Jr. |
| 4,371,746 A | | 2/1983 | Pepper, Jr. |
| 4,600,807 A | | 7/1986 | Kable |
| 4,661,655 A | | 4/1987 | Gibson et al. |
| 4,694,573 A | | 9/1987 | Nishino et al. |
| 4,697,885 A | | 10/1987 | Minowa et al. |
| 4,731,508 A | | 3/1988 | Gibson et al. |
| 4,822,957 A | | 4/1989 | Talmage, Jr. et al. |
| 4,846,869 A | | 7/1989 | Palanisamy |
| 5,041,701 A | | 8/1991 | Wolfe et al. |
| 5,045,644 A | | 9/1991 | Dunthorn |
| 5,115,905 A | * | 5/1992 | Hollinger, II |
| 5,248,028 A | * | 9/1993 | Weiblen et al. |
| 5,346,651 A | | 9/1994 | Oprosky et al. |
| 4,220,815 A | | 9/1996 | Gibson et al. |
| 4,661,655 A | | 1/1997 | Gibson et al. |
| 5,815,141 A | | 9/1998 | Phares |
| 5,886,687 A | | 3/1999 | Gibson |
| 5,940,065 A | | 8/1999 | Babb et al. |

OTHER PUBLICATIONS

U.S. patent application Ser. No. 09/169,391, Huang et al., filed Oct. 9, 1998.
U.S. patent application Ser. No. 09/775,253, Bottari et al., filed Feb. 1, 2001.
U.S. patent application Ser. No. 09/773,979, Bottari et al., filed Feb. 1, 2001.

* cited by examiner

Primary Examiner—Michael Colaianni
(74) Attorney, Agent, or Firm—Robert J. Pechman

(57) ABSTRACT

A conveyor belt including a series of predefined sections and elevated support structures at the edges of each section for supporting items on the belt above the belt at each section.

10 Claims, 5 Drawing Sheets

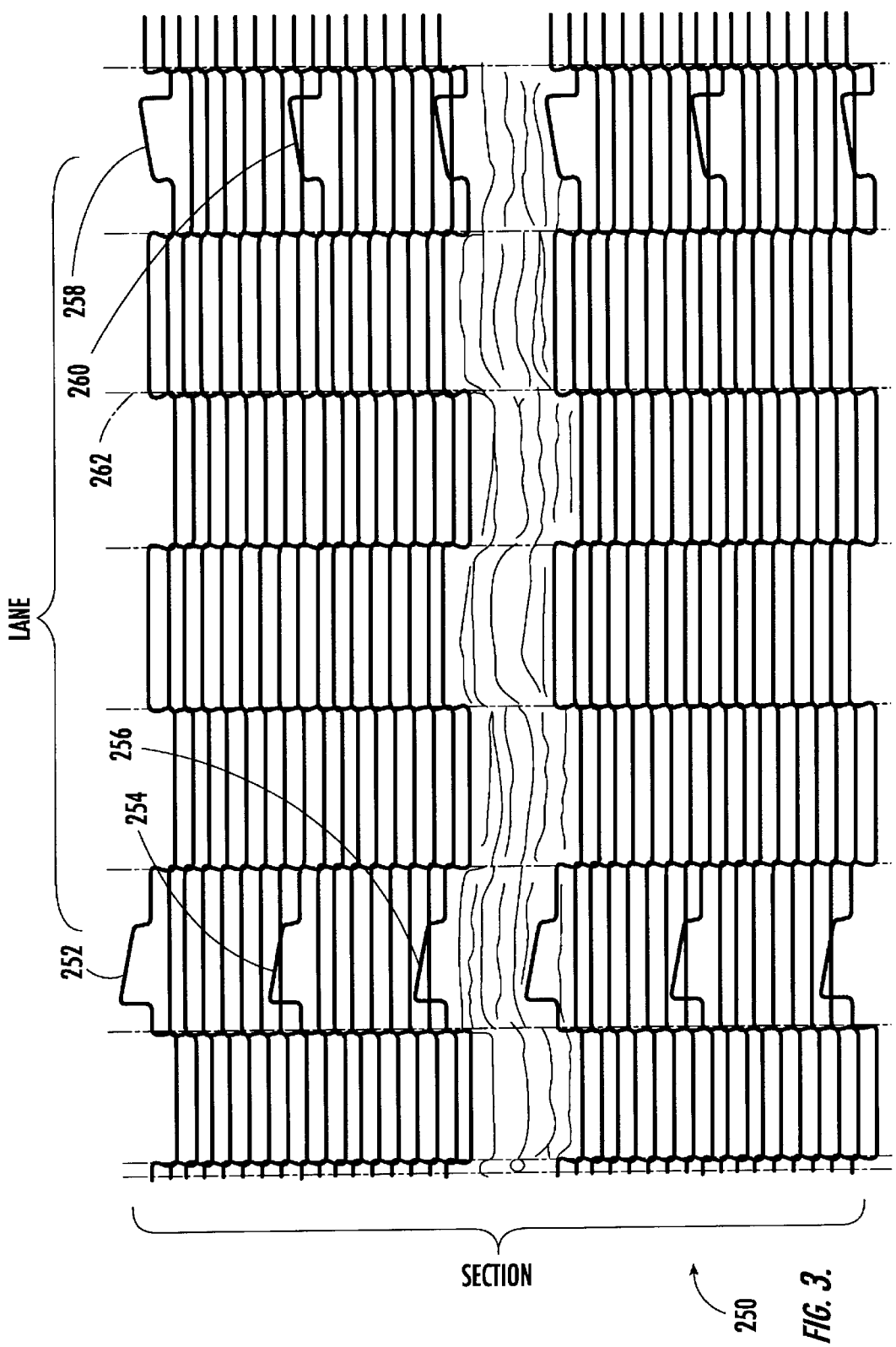

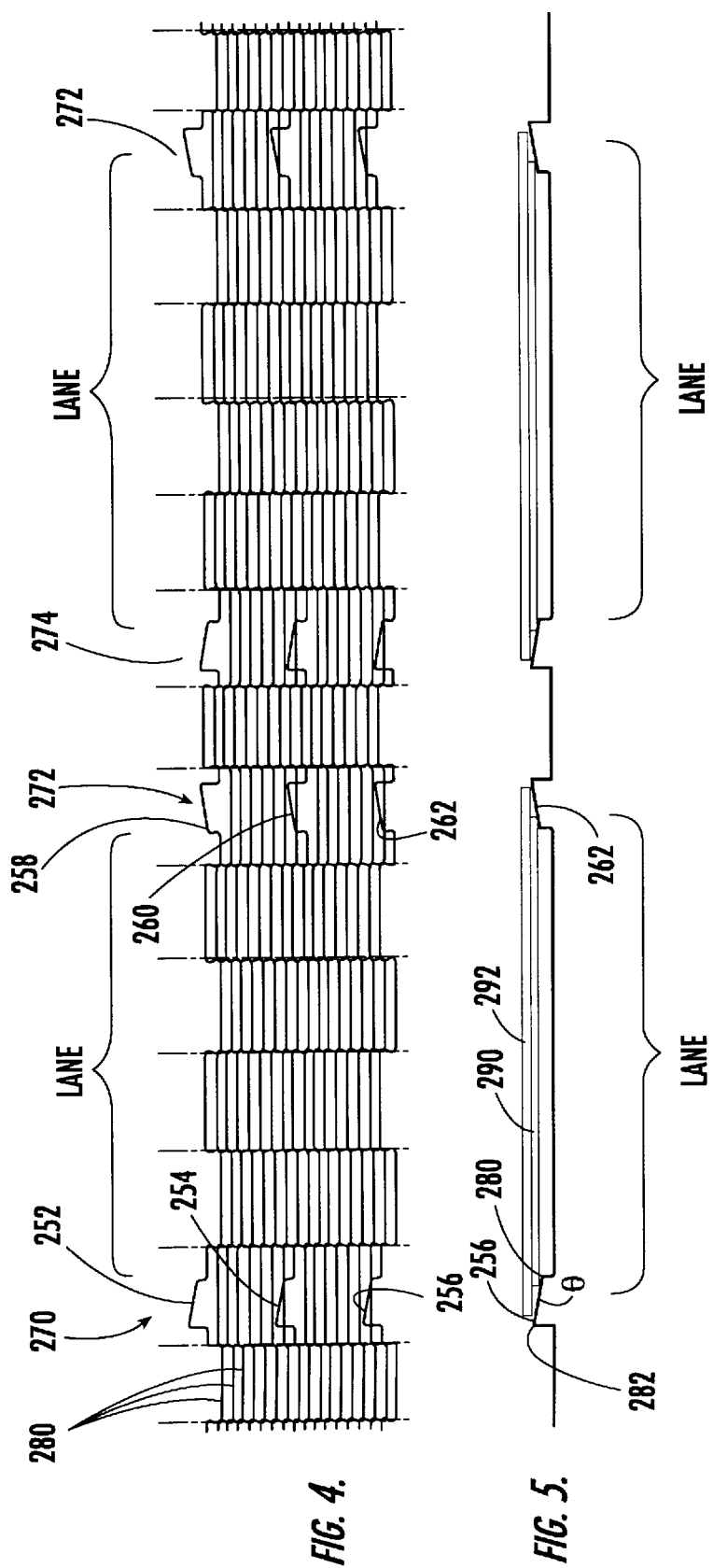

CONVEYOR BELT

FIELD OF THE INVENTION

This invention relates to a conveyor belt useful for supporting and conveying glass substrates through a curing furnace.

BACKGROUND OF THE INVENTION

Touch screens are now ubiquitous and used as the input and display interface at, for example, automatic teller machines, gambling machines in casinos, cash registers, and the like. Touch screen panels generally comprise an insulative (e.g., glass) substrate and a resistive layer disposed on the insulative substrate. A pattern of conductive edge electrodes are then formed on the edges of the resistive layer. The conductive electrodes form orthogonal electric fields in the X and Y directions across the resistive layer. Contact of a finger or stylus on the active area of the panel then causes the generation of a signal that is representative of the X and Y coordinates of the location of the finger or stylus with respect to the substrate. In this way, the associated touch panel circuitry connected to the touch panel by wiring traces can ascertain where the touch panel occurred on the substrate.

Typically, a computer program generates an option to the user (e.g., "press here for 'yes' and press here for 'no'") on a monitor underneath the touch screen panel and the conductive electrode pattern assists in detecting which option was chosen when the touch panel was touched by the user.

During the production of a touch screen panel, the panel may be subjected to one or more manufacturing steps wherein it is placed in or conveyed through an oven or furnace. High temperature curing is also a common processing step in the manufacture of many products using glass substrates (e.g., touch screens, flat panel displays, etc.) The glass substrate and/or fragile coatings on one or both surfaces of the substrate can be damaged by physical contact. Prior art methods of transporting glass substrates through conveyor furnaces commonly use metallic conveyor belts. The glass substrates are placed directly on top of and in full contact with the metal conveyor belt. This causes several problems. First, both glass substrates and coated glass substrates have fragile surfaces that are easily scratched by contact with the hard metal conveyor belt surface. Second, metal conveyor belts have large thermal mass and have different thermal properties than glass. When glass substrates are in contact with a large area of the metal conveyor belt, glass breakage in heating and cooling is a major process yield issue. This is even worse in a rapid thermal process where the glass substrates are heated and cooled as quickly as possible. Third, the standard conveyor belt does little to position or guide the substrate while it travels through the furnace nor does it provide a predictable position at the exit end of the furnace so that the substrate can be correctly fed to downstream processes.

Sometimes, high-temperature fabrics are used as insulation between the standard metal conveyor belt and the glass substrates to control glass breakage and scratching. The problems with this method are that many uncured coatings can not be placed in direct contact with the fabric without being damaged. Also, the fabric materials often liberate fibers which can contaminate the product. In addition, the fabric pads have to be individually placed on the belt under the substrate and thus are conducive only to a manual, non-automated operations.

In some cases, metal trays or "boats" are used to transport glass substrates on standard metal conveyor belts. These trays allow the glass substrate to be supported by the edges and elevated off of the conveyor belt. Problems with these trays include glass breakage due to the significant thermal mass and different heating and cooling rates than the glass they support. Also, they must be individually placed on the conveyor belt and under the glass substrate making them appropriate only for manual, non-automated processes. Finally, the trays are somewhat fragile and require maintenance, cleaning and replacement on a regular basis.

Driven ceramic rollers can also be used to transport glass substrates through a process furnace. The rollers can be made so that they contact the glass only on two edges and provide minimal frictional contact. Problems with this method include the necessity for a complicated drive train required to synchronously drive all the rollers in the furnace. Second, the rollers are mounted in fixed positions in the furnace. In operation, each roller will achieve a steady-state temperature depending on its position in the heating or cooling section of the furnace. As a substrate is conveyed through the furnace, it gains and rejects heat at a rate dependent on its material properties and mass. When the glass substrate contacts a significant area of a ceramic roller that is not close to its surface temperature, glass breakage can occur. This is especially true for rapid thermal processing. Third, ceramic roller contact with the glass can cause abrasion that can contaminate the product with glass particles, ceramic particles, or both.

Edge conveyors can also be used to support and transport glass substrates through a conveyor furnace. Parallel edge conveyors can be designed to be adjusted in an automated manner and provide a predictable positioning of the substrate inside the furnace and as it exits the furnace to feed downstream processes. Some problems with edge conveyors are the fact that they are complicated and expensive devices that incorporate special components that are designed to survive in a high-temperature environment. Sometimes, special liquid cooling systems are required to maintain component temperatures within acceptable limits. In addition, edge conveyors take up substantial space in the furnace and require the furnace chamber to be made larger than normal to accommodate them. Edge conveyors also have substantial thermal mass and require that the furnace power be greater than normal to accommodate them. Operating costs are then greater than normal. Finally, adjustment of the edge conveyor system must be made either manually or through a control signal actuating a drive component.

SUMMARY OF THE INVENTION

It is therefore an object of this invention to provide a new conveyor belt for supporting and conveying glass substrates and other fragile or delicate items through a conveyor furnace.

It is a further object of this invention to provide such a conveyor belt which prevents scratching of the item placed thereon.

It is a further object of this invention to provide such a conveyor belt which avoids breakage of the item placed on it and which overcomes the thermal mismatch problem associated with prior art conveyor belts.

It is a further object of this invention to provide such a conveyor belt which automatically guides the items placed thereon into the correct position.

It is a further object of this invention to provide such a conveyor belt which is better suited to automated manufacturing processes.

It is a further object of this invention to provide such a conveyor belt which is simple in design and which can be manufactured at a low cost.

It is a further object of this invention to provide such a conveyor belt which eliminates the need for high-temperature fabrics and the problems associated with them including contamination.

It is a further object of this invention to provide such a conveyor belt which eliminates the need for metal trays and the problems associated with them.

It is a further object of this invention to provide such a conveyor belt which overcomes the problems associated with driven ceramic rollers and edge conveyors.

The invention results from the realization that the problems associated with prior art conveyor belts used to transport sensitive or fragile items such as touch screens through a furnace or oven, namely the formation of scratches, contamination, and breakage due to thermal mismatching can be overcome by bending certain flight members of a conventional wire belt upwardly to define elevated and inclined support surfaces which only contact the edge of the glass touch screen at one small point and support the touch screen above the belt to better guide touch screens of different sizes without scratching, breaking, or contaminating them in an automated fashion.

This invention features a conveyor belt comprising a series of predefined sections and elevated support structures at the edges of each end of each section for supporting items on the belt above the belt at each said section. Typically, each support structure is sloped outwardly upward and each section includes a plurality of flight members. The support structure is typically formed by bending a set of the flight members upwardly to define an elevated surface inclined outwardly upward. The preferable angle of incline is between 5° and 10°. The elevated support surface can be elevated from between 0.2 and 0.4 inches from the belt at its lowest point and from between 0.5 and 0.7 inches from the belt at its highest point and each elevated surface has a typical length of between 1 and 2 inches to accommodate items of different size.

Usually, the bent set of flights are spaced from each other and there are a number of bent flights at the edges of each section. Also, each section usually includes more than one product travel lane. In the preferred embodiment, the elevated support structures are integral with the conveyor belt.

A method of manufacturing a touch screen in accordance with this invention includes bending selected flight members of a conveyor belt in an oven upwardly to define a plurality of elevated surface each inclined outwardly upward at the end of selected sections of the belt and placing the touch screens on the belt such that the edges of the touch screen rest on the elevated surfaces to dry, cure, or fire the touch screen in an oven without the touch screen touching the conveyor belt other than at the edges. One conveyor belt according to this invention includes a series of predefined sections each including a plurality of flight members, a set of flight members at the edges of each section bent upwardly to define elevated and inclined support surfaces.

BRIEF DESCRIPTION OF THE DRAWINGS

Other objects, features and advantages will occur to those skilled in the art from the following description of a preferred embodiment and the accompanying drawings, in which:

FIG. 3 is a top view showing two sections and two lanes of the modified conveyor belt of the subject invention;

FIG. 4 is a top view showing two sections of a single lane of the modified conveyor belt of the subject invention;

FIG. 5 is a side view of the portion of the belt shown in FIG. 3; and

DISCLOSURE OF THE PREFERRED EMBODIMENT

Although the disclosure which follows relates to primarily to touch screens, the invention is not limited to conveyor belts for touch screens and instead can be used in connection with items or products which are sensitive to scratching, contamination, or thermal mismatch problems.

Figure 1:
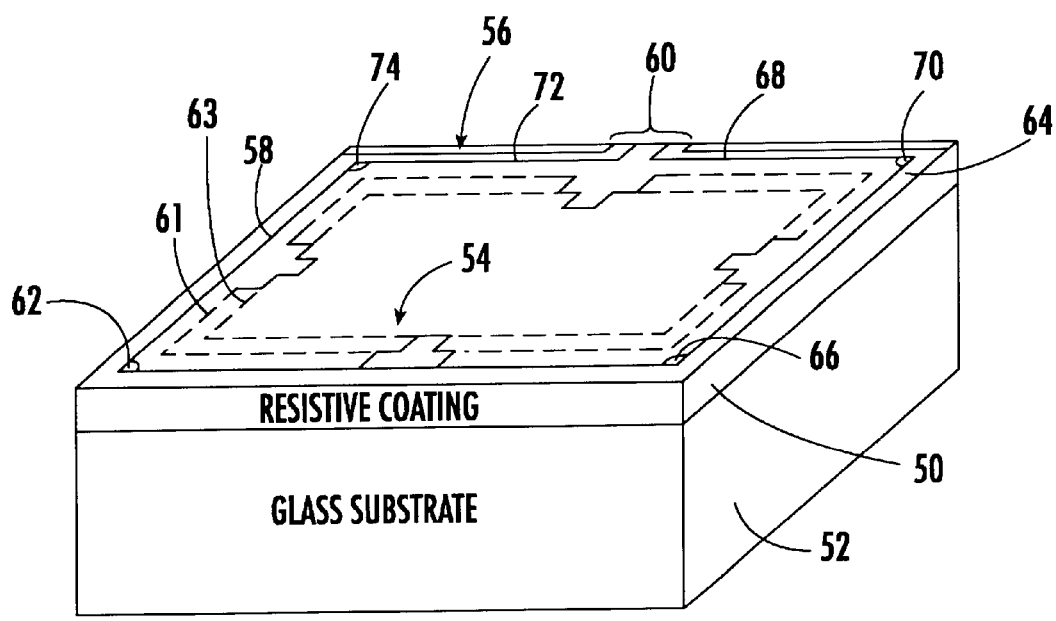
FIG. 1 is a schematic three dimensional view of a touch screen just after the conductive edge electrodes and the wire traces have been applied to the resistive coating.

Touch screen panel 48, FIG. 1 in accordance with this invention is manufactured by applying a resistive coating 50, (e.g., tin antimony oxide) by a vacuum sputter process to glass substrate 52 (e.g., a soda lime glass composition), step 100, FIG. 3. Coating 50 is typically less than 1,000 Angstroms thick and substrate 52 is typically between 1–3 mm thick and 15 inches on a diagonal depending on the specific application.

Conductive edge electrode pattern 54, FIG. 1 including conductors 61 and 63 is then screen printed on resistive coating 50 using a conductive silver/frit paste (Dupont 7713). Alternatively, a decal is used as disclosed in copending U.S. patent application Ser. Nos. 09/775,253 and 09/773,979.

As shown in FIG. 1, wire trace 58 begins at junction 60 and extends along the edge of panel 48 to corner electrode 62 of edge electrode pattern 54. Wire trace 64 similarly begins at junction 60 and extends along the opposite edge of panel 48 to corner electrode 66 of edge electrode pattern 54. Wire trace 68 begins at junction 60 and extends to corner electrode 70 and wire trace 72 begins at junction 60 and extends to corner electrode 74 of edge electrode pattern 54. The height of each wire trace is typically between 12–16 microns and between 0.015 inches and 0.025 inches wide.

Edge electrode pattern 54 may take the form of the pattern disclosed in corresponding application Ser. No. 09/169,391 or the forms discloses in U.S. Pat. No. 4,198,539; 4,293,734; or 4,371,746 incorporated herein by this reference. Typically, the edge electrode pattern occupy only about one quarter inch on the edges of panel 48 and thus FIG. 1 is not to scale.

After a drying operation at 120° C. for five minutes is employed to dry the silver/frit paste, the wire traces and the edge electrodes must then be fired in an oven. In some cases, an insulative border layer is applied over the edge electrodes and the wire traces. That border layer must also be dried and cured an oven. In some cases a hard coat and/or additional coatings (e.g., antimicrobial and/or antiscratch coatings) are applied and must be dried, fired, and/or cured in an oven. The width of border layer 67, FIG. 2 is typically about 1 quarter inch and has a height of about 12 microns after firing.

The preferred firing profile consists of a ramp from room temperature up to 500–525° C. in approximately 5 minutes in order to complete the solvent evaporation and burn out the organic binders in the thick film materials. The ramp is followed by a dwell period above 500° C. for 2–3 minutes to allow the frit glass to melt and the silver to sinter. The substrate is then brought back to ambient temperature. An optional firing profile may consist of a ramp from room temperature to 300° C. with a dwell period between 300–400° C. for 6–10 minutes to provide additional time to burn out the organic binders if required. This dwell period is followed by a second ramp to the peak temperature of 500–525° C. with little or no dwell period. The substrate is then brought back to room temperature.

Figure 2:
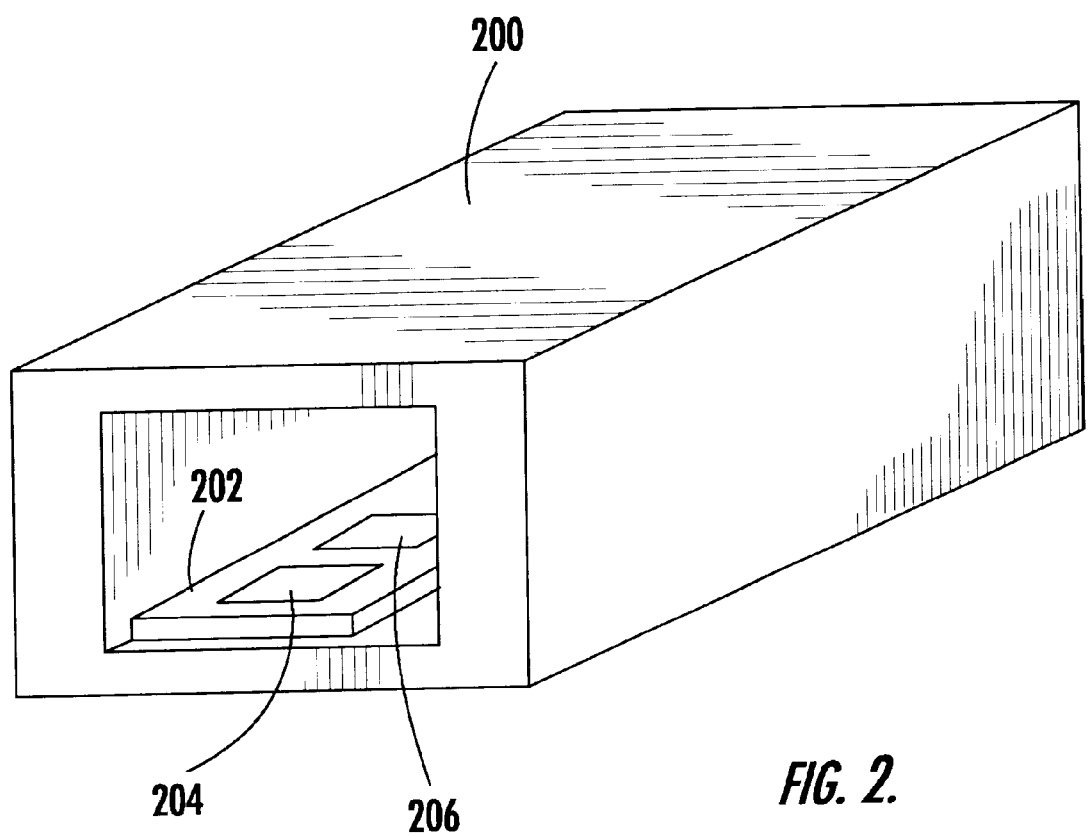
FIG. 2 is a schematic three dimensional view of a typical oven or furnace used in the manufacturing of the touch screen shown in FIGS. 1 and 2.

Accordingly, the production of a touch screen panel can involve as many as five treatment steps in an oven or furnace 200, FIG. 2 and it is highly desirable that all of these steps take place in an automated fashion by using conveyor system 202 to transport touch screens 204 and 206 therethrough.

As stated in the Background section above, prior art conveyor systems often scratched the touch screen panels, caused the touch screen panels to break due to thermal mismatch problems, and/or resulted in a contamination of the touch screens. As explained above, the manufacturing steps involved in producing a single touch screen panel involves many man hours and many different kinds of materials both of which are wasted if the touch screen panel is damaged in a conveyor furnace.

In this invention, damage to the touch screen panel is reduced if not eliminated. The problems associated with prior art conveyor belts used to transport sensitive or fragile items including, but not limited to, touch screen panels through a furnace or oven, namely the formation of scratches, contamination, and breakage due to thermal mismatching is overcome by bending certain flight members of wire belt 250, FIG. 3 at the edges of each product section upwardly as shown to define elevated and inclined support surfaces 252, 254, 256, 258, 260, and 262 each of which only contact the edge of the glass touch screen at one small point and support the touch screen above belt 250 to better position and guide touch screens of different sizes without scratching, breaking, or contaminating them in an automated fashion and thus reducing losses to product materials and eliminating wasted man hours.

Wire type conveyor belt 250, FIGS. 3–5 thus includes a series of predefined lanes (one is shown in FIG. 3, two are shown in FIG. 4), and sets of integral elevated support structures 270, 254, 260, and 262, FIG. 4 per lane for supporting items on the belt above the belt at each section. Typically, one touch panel occupies about four bent flights on each side in a lane. As shown, it is preferred that each support structure is sloped outwardly upward. In the preferred embodiment where the belt is a wire belt, each lane includes a plurality of flight members 280, FIG. 4, and each support structure is formed by bending a set of the flight members upwardly to defined elevated surfaces 252, 254, 256, 258, 260, and 262 each inclined outwardly upward as shown. The typical angle θ, FIG. 5, is between 5° and 10° to center the touch screens on the bent flights. Each elevated surface is typically elevated from between 0.2 and 0.4 inches from the plane of the belt at its lowest point (point 280, FIG. 5) and from between 0.5 and 0.7 inches from the plane of the belt at its highest point (point 282, FIG. 5). The length of elevated surface 262 is typically between 1 and 2 inches to accommodate touch screens 290 and 292 of different sizes. In one specific embodiment, point 280 was 0.37 inches high and point 282 was 0.60 inches high. Surface 262 was 1.75 inches long. The bent set of flights 252, 254, and 256 are spaced from each other as shown and there are typically four bent flights per section.

By angling each elevated bent flight, only a point contact is made with the edge of the touch screen which reduces scratches. Moreover, the touch screens are held in place by the effect of gravity. The elevation of each bent flight above the plane of the belt also reduces scratches and prevents thermal mismatch problems.

There are typically 32 flights per foot and each lane is typically about 20 inches with a spacing about 2.75 inches between lanes. The spacing between bent flights 252 and 258 is between 10 and 14 inches, typically about 13 inches. In the embodiment shown, every eighth flight is bent as shown in FIG. 4. In this way, items such as glass substrates are supported on a metal conveyor belt, but the bottom surface of the item does not come into contact with the conveyor belt. Certain flights of the conveyor belt are bent so that they support the glass only by the edges and elevate the glass off the main surface of the conveyor belt. By inclining the top surfaces of the bent flights, the glass substrate is only supported at a small point contact on the glass edge. The inclined surface also allows a range of substrate sizes to be supported on the modified belt flights without any adjustment or additional tooling. The belt flights can be arrayed on the conveyor belt to establish product travel lanes that accurately position the products so that they are properly positioned in the furnace for processing and so that the product is in the proper orientation on the conveyor belt to feed downstream processes.

Figure 6:
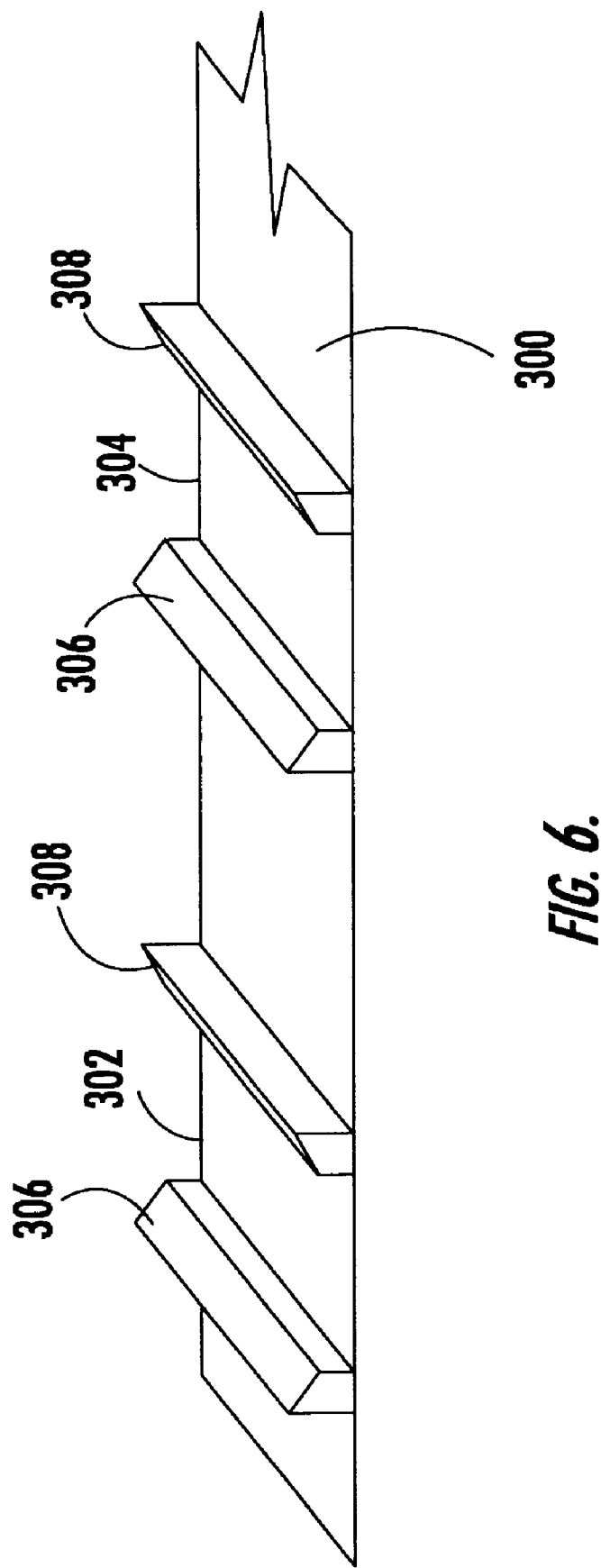
FIG. 6 is a conceptual schematic view of a conveyer belt in accordance with the subject application.

The conveyer belt design of the subject invention, however, is not limited to the design shown in FIGS. 3–5. Others skilled in the art will understand how to devise conveyer belt 300, FIG. 6 with sections 302, 304, etc the ends of which are defined by elevated, inclined support structures 306 and 308 which support items on belt 300 above the belt at each section.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of manufacturing a touch screen, the method comprising:
   bending selected spaced flight members of a wire type conveyor belt to define a plurality of spaced elevated support surfaces each inclined outwardly upward; and
   placing the touch screens on the belt such that the edges of the touch screens rest on the elevated support surfaces to dry, cure, or fire the touch screens in an oven without the touch screens touching the conveyor belt other than at the edges.

2. The method of claim 1 in which there are at least two lanes on the conveyor belt, each lane including two spaced rows of bent flight members.

3. The method of claim 2 in which the bent flight members in each row are separated by a plurality of non-bent flight members.

4. The method of claim 1 in which the angle of incline is between 5° and 10°.

5. The method of claim 1 in which each elevated support surface is from between 0.2 and 0.4 inches from the belt at its lowest point and from between 0.5 and 0.7 inches from the belt at its highest point.

6. The method of claim 1 in which each elevated surface has a length of between 1 and 2 inches to accommodate items of different size.

7. The method of claim 1 in which the spacing between each pair of bent flight members is between 10 and 14 inches.

8. A method of manufacturing a touch screen, the method comprising:

bending selected flight members of a wire type conveyor belt to define at least two spaced rows of bent flight members, each row including a plurality of spaced elevated support structures each inclined upwardly outward; and placing a touch screen such that it lies only on the elevated support structures to prevent damage to the touch screen.

9. The method of claim 8 in which the angle of incline of each support structure is between 5° and 10° to center the touch screen.

10. The method of claim 9 in which the spacing between the rows of bent flight members is between 10 and 14 inches to accommodate touch screens of different sizes.

* * * * *